(12) United States Patent
Lin

(10) Patent No.: US 11,190,071 B2
(45) Date of Patent: Nov. 30, 2021

(54) OUTER ROTOR TYPE MOTOR

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 110 days.

(21) Appl. No.: 16/707,068

(22) Filed: Dec. 9, 2019

(65) Prior Publication Data

US 2021/0175762 A1    Jun. 10, 2021

(51) Int. Cl.
*H02K 1/30* (2006.01)
*H02K 1/27* (2006.01)
*H02K 5/04* (2006.01)
*H02K 7/08* (2006.01)

(52) U.S. Cl.
CPC .............. *H02K 1/30* (2013.01); *H02K 1/274* (2013.01); *H02K 1/2786* (2013.01); *H02K 5/04* (2013.01); *H02K 7/083* (2013.01)

(58) Field of Classification Search
CPC ........ H02K 1/30; H02K 7/083; H02K 1/2786; H02K 5/04; H02K 1/274
See application file for complete search history.

(56) References Cited

U.S. PATENT DOCUMENTS

2010/0139999 A1* 6/2010 Park ................. H02K 16/02
180/65.51

FOREIGN PATENT DOCUMENTS

TW    201320544 A    5/2013

* cited by examiner

*Primary Examiner* — Tulsidas C Patel
*Assistant Examiner* — Riley Owen Stout
(74) *Attorney, Agent, or Firm* — Birch, Stewart, Kolasch & Birch, LLP

(57) ABSTRACT

An outer rotor type motor includes a rotating unit and a fixing unit. The rotating unit includes an inner surrounding wall surrounding a stationary shaft of the fixing unit and an outer surrounding wall surrounding the inner surrounding wall. A spool support is connected to the stationary shaft. Spools are connected to the spool support, surround the stationary shaft and are wound by windings. Outer magnetic members are disposed on the outer surrounding wall. Inner magnetic members are disposed on the inner surrounding wall. When the windings are energized, the inner and outer magnetic members are rotated about the stationary shaft so that the rotating unit is rotated relative to the fixing unit.

3 Claims, 4 Drawing Sheets

OUTER ROTOR TYPE MOTOR

FIELD

The disclosure relates to a motor, more particularly to an outer rotor type motor.

BACKGROUND

An existing motor, as disclosed in Taiwanese patent application No. 201320544, includes two magnetic plates spaced apart from each other in a direction of a motor axis, and a coil plate disposed between the magnetic plates. Each magnetic plate includes a plurality of first magnetic members which are annularly spaced apart from each other around the motor axis and each of which has a magnetic pole face perpendicular to the motor axis, and a plurality of second magnetic members which are annularly spaced apart from each other and each of which has a magnetic pole face perpendicular to the motor axis. The coil plate includes a plurality of windings which are annularly spaced apart from each other around the motor axis and each of which extends parallel with the motor axis.

In use, the windings are energized to produce a magnetic field, the first and second magnetic members are rotated by magnetic forces so that the magnetic plates are rotated relative to the coil plate. The relative movement of the magnetic plates to the coil plate generates a force serving as a torque of the existing motor.

However, to increase the torque, the first and second magnetic members have to be enlarged in a direction perpendicular to the motor axis. Because the first and second magnetic members are disposed at angular intervals, the size of each magnetic plate has to be radially enlarged. Therefore, the size of the motor is increased. An increased size of the motor requires more occupying space and can even cause difficulties in installing the motor.

SUMMARY

Therefore, an object of the disclosure is to provide an outer rotor type motor that can alleviate at least one of the drawbacks of the prior art.

According to the disclosure, an outer rotor type motor includes a rotating unit, a fixing unit, a plurality of annularly spaced-apart outer magnetic members, a plurality of inner magnetic members, and a plurality of windings.

The rotating unit defines an axis, and includes a base wall, an inner surrounding wall, an outer surrounding wall and a cover. The base wall is perpendicular to and rotatable about the axis. The inner surrounding wall projects axially from the base wall. The outer surrounding wall projects axially from the base wall and surrounds the inner surrounding wall. The cover is connected to one end of the outer surrounding wall oppositely of the base wall.

The fixing unit includes a stationary shaft, a spool support and a plurality of spools. The stationary shaft extends along the axis through the base wall and the cover, and is surrounded by the inner surrounding wall. The rotating unit is rotatable about the fixing shaft. The spool support is connected to and extends radially from the stationary shaft between one end of the inner surrounding wall and the cover. The spools are connected to the spool support and extend axially between the inner and outer surrounding walls. The spools are annularly spaced apart from each other around the stationary shaft.

The outer magnetic members are disposed on an inner side of the outer surrounding wall facing the inner surrounding wall. Two adjacent ones of the outer magnetic members respectively have magnetic poles that face the inner surrounding wall and that are magnetically opposite to each other.

The inner magnetic members are equal in number to the outer magnetic members. The inner magnetic members are annularly spaced apart from each other and are disposed on an outer side of the inner surrounding wall to be respectively aligned with the outer magnetic members. Two adjacent ones of the inner magnetic members respectively have magnetic poles that face the outer surrounding wall and that are magnetically opposite to each other. The magnetic pole of each of the inner magnetic members is opposite to that of a respective one of the outer magnetic members.

The windings are respectively wound on the spools. When the windings are energized to produce a magnetic field, the inner and outer magnetic members are rotated by magnetic forces about the stationary shaft so that the rotating unit is rotated relative to the fixing unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
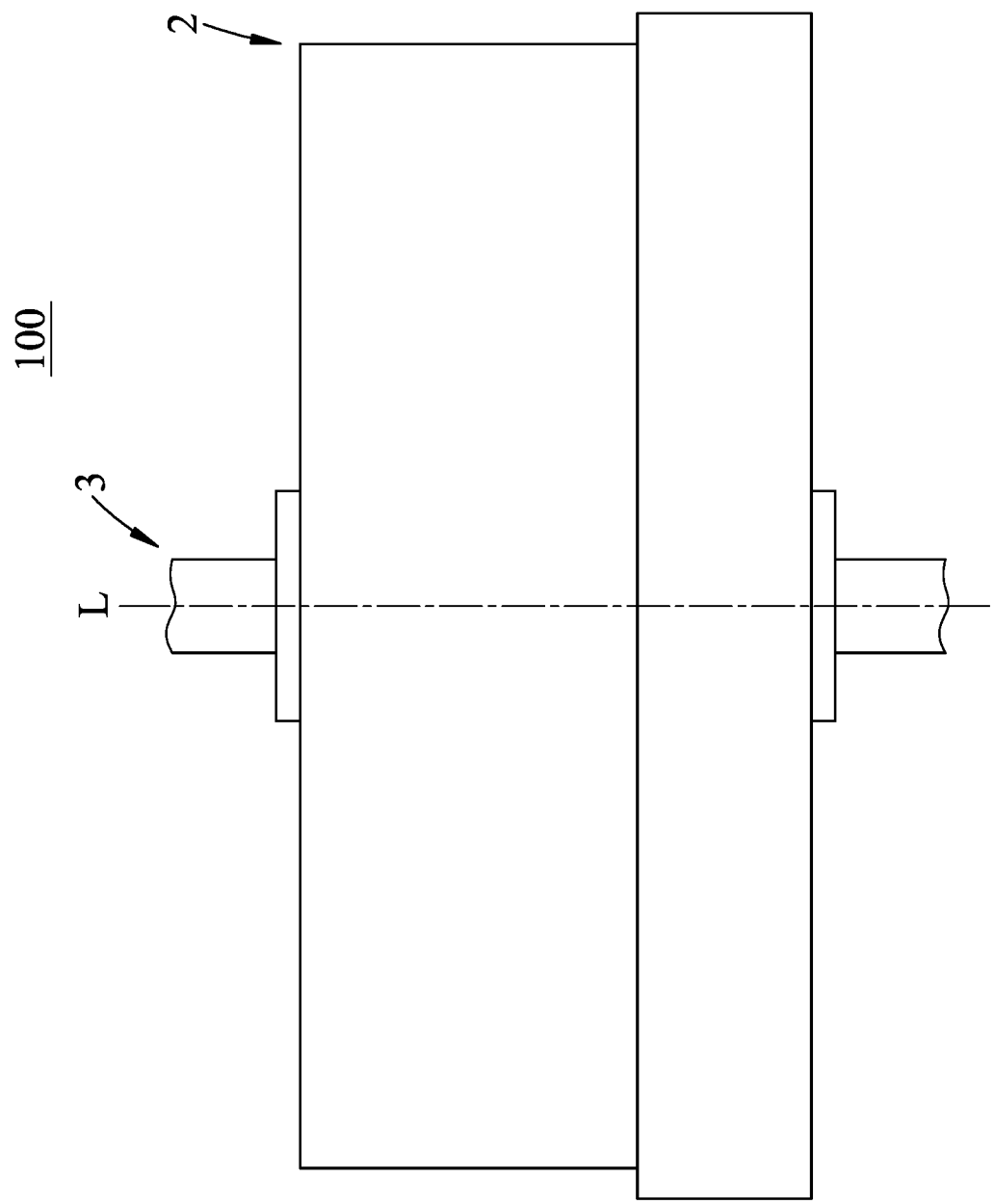
FIG. 1 is a front view illustrating an outer rotor type motor according to an embodiment of the disclosure.
Figure 2:
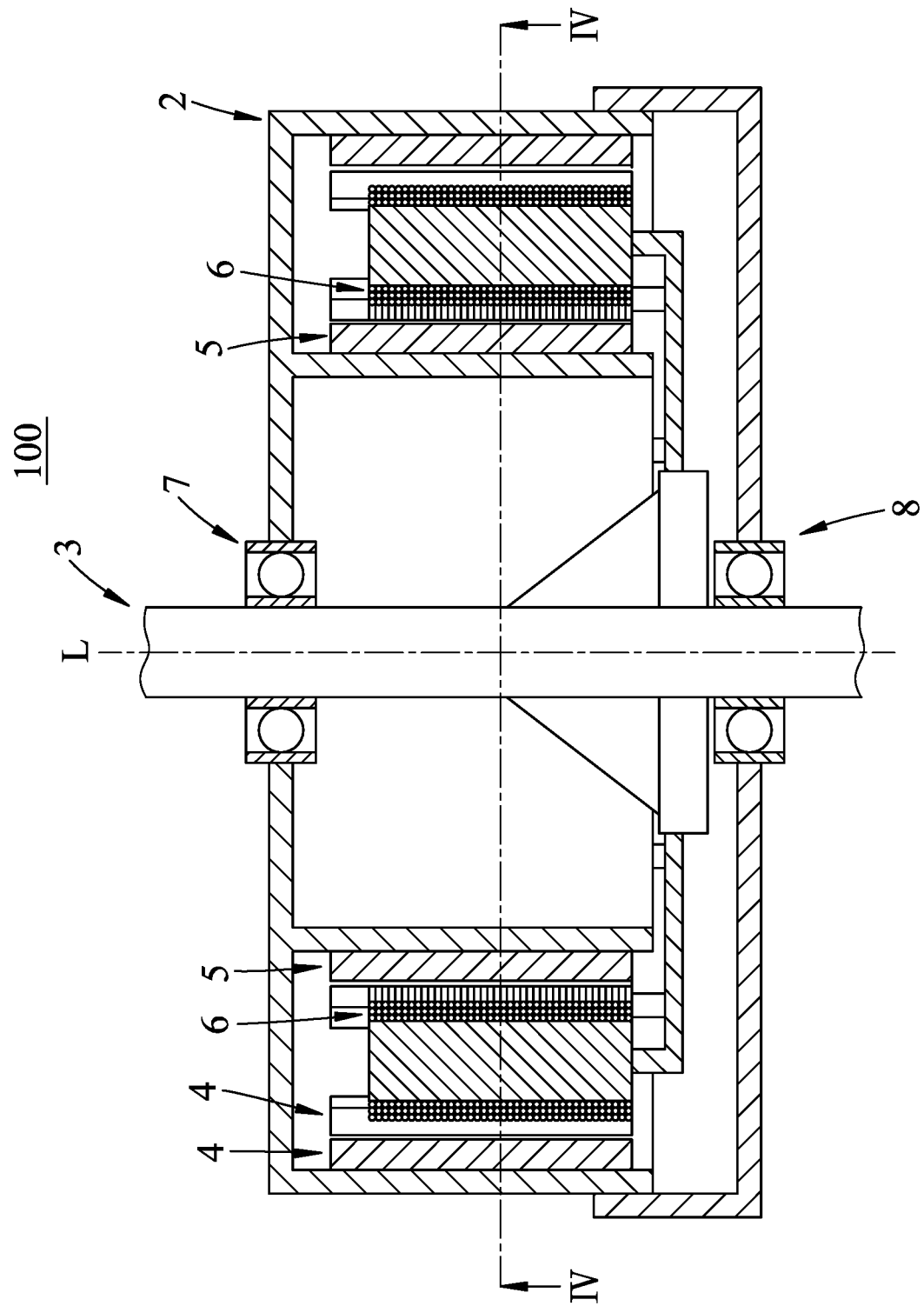
FIG. 2 is a sectional view of the embodiment.
Figure 3:
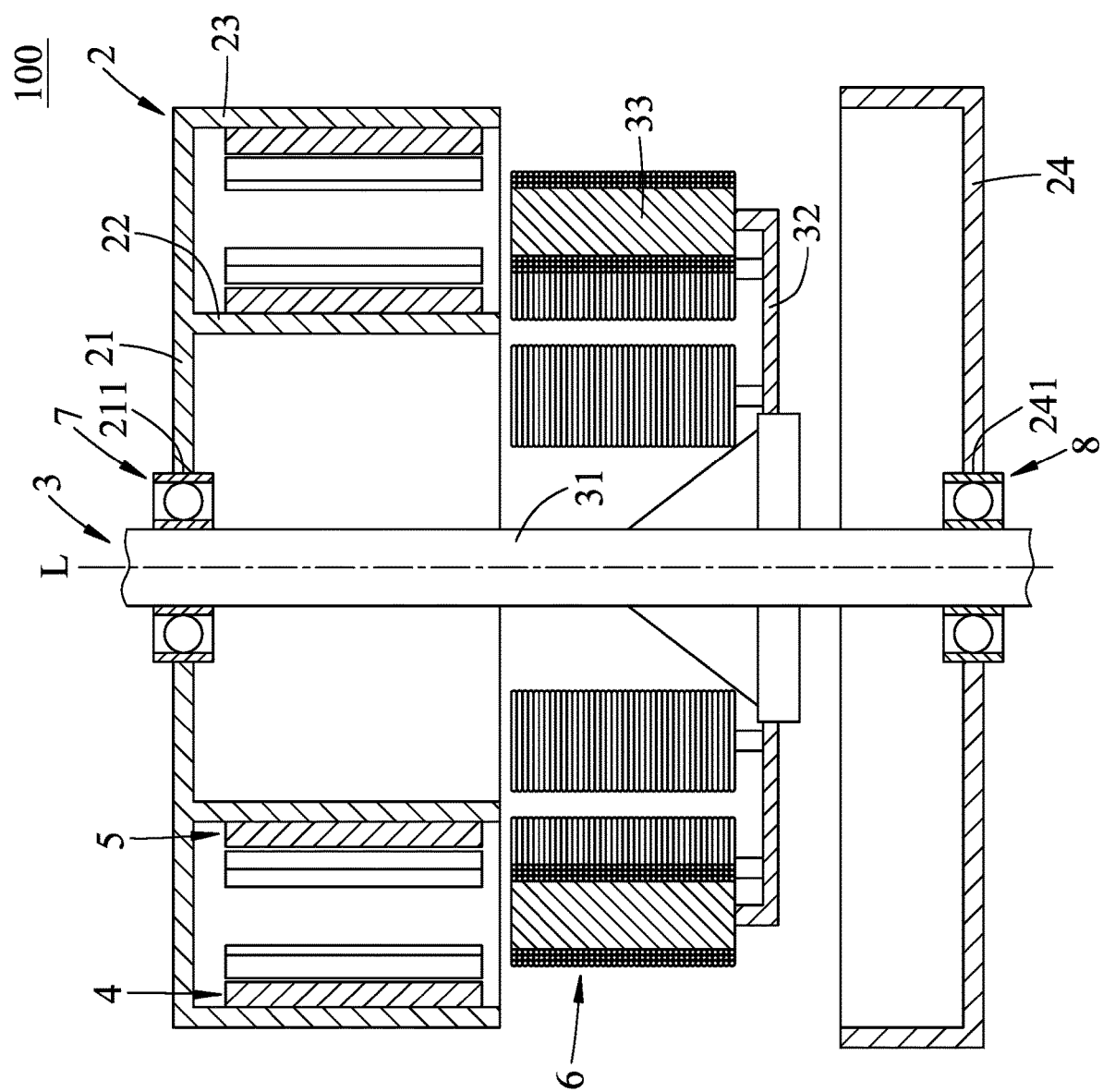
FIG. 3 is an exploded sectional view of the embodiment.

FIGS. 1 to 3 illustrate an outer rotor type motor 100 according to an embodiment of the disclosure. The outer rotor type motor 100 includes a rotating unit 2, a fixing unit 3, a plurality of outer magnetic members 4, a plurality of inner magnetic members 5, a plurality of windings 6, a first bearing 7 and a second bearing 8.

Figure 4:
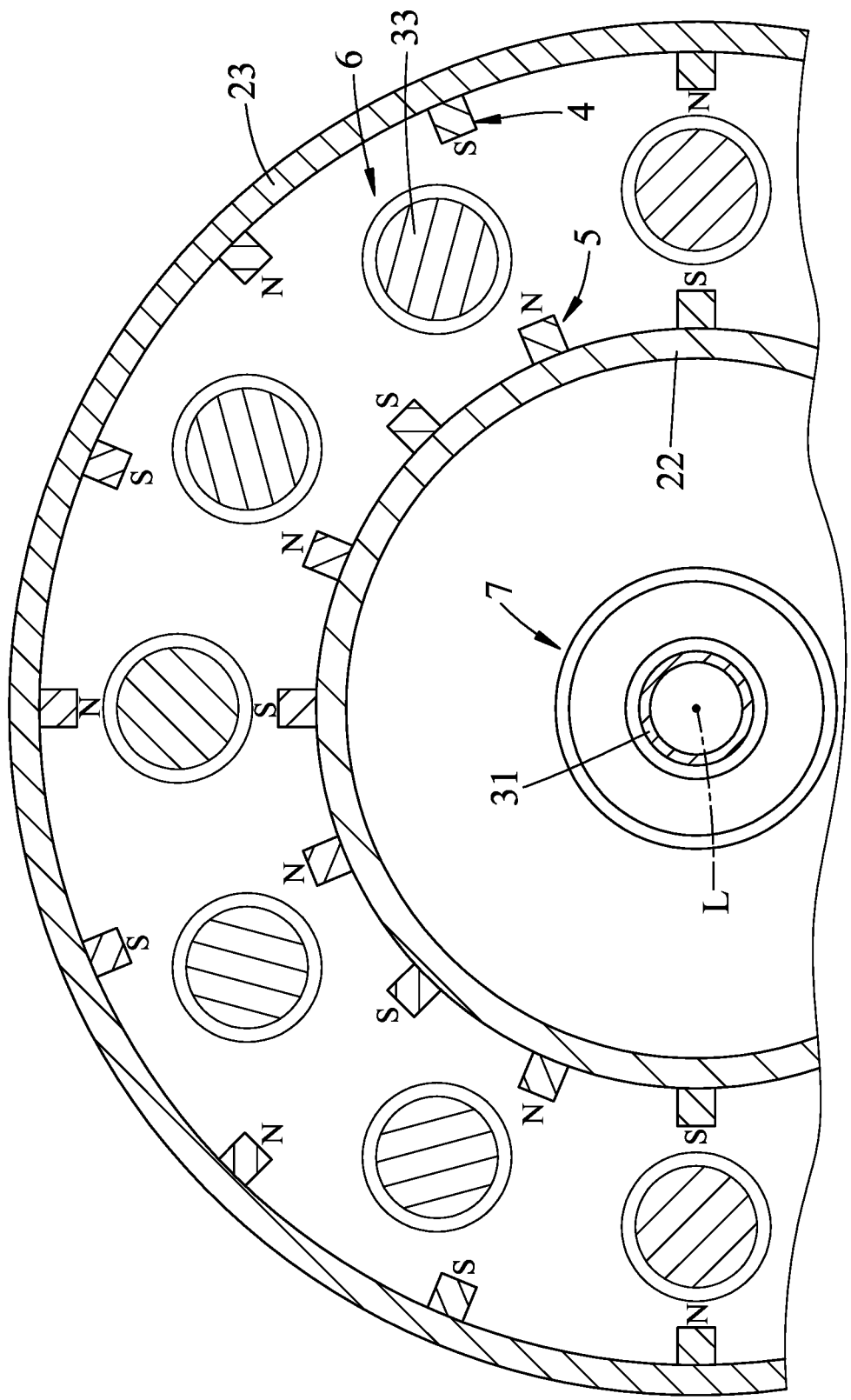
FIG. 4 is a fragmentary sectional view taken from line IV-IV of FIG. 2.

As shown in FIG. 4, in combination with FIGS. 2 and 3, the rotating unit 2 defines an axis (L), and includes a base wall 21, an inner surrounding wall 22, an outer surrounding wall 23 and a cover 24. The base wall 21 is perpendicular to and is rotatable about the axis (L). The inner surrounding wall 22 projects axially from the base wall 21. The outer surrounding wall 23 projects axially from the base wall 21 and surrounds the inner surrounding wall 22. The cover 24 is connected to one end of the outer surrounding wall 23 oppositely of the base wall 21. In this embodiment, the outer rotor type motor 100 is suitable for a ceiling fan (not shown). The rotating unit 2 is connectible to a plurality of fan blades (not shown) to rotate the fan blades.

Further, the base wall 21 has a first bearing hole 211. The cover 24 has a second bearing hole 241.

The fixing unit 3 includes a stationary shaft 31, a spool support 32 and a plurality of spools 33. The stationary shaft 31 extends along the axis (L) through the base wall 21 and the cover 24, and is surrounded by the inner surrounding wall 22. The rotating unit 2 is rotatable about the fixing shaft 31. The spool support 32 is connected to and extends radially from the stationary shaft 31 between one end of the inner surrounding wall 22 and the cover 24. The spools 33 are connected to the spool support 32, and extend axially between the inner and outer surrounding walls 22, 23. The spools 33 are annularly spaced apart from each other around the stationary shaft 31.

The outer magnetic members 4 are annularly spaced apart from each other and are disposed on an inner side of the outer surrounding wall 23 facing the inner surrounding wall 22. Two adjacent ones of the outer magnetic members 4 respectively have magnetic poles that face the inner surrounding wall 22 and that are magnetically opposite to each other (see the magnetic symbols N, S shown in FIG. 4.)

The inner magnetic members 5 are equal in number to the outer magnetic members 4. The inner magnetic members 5 are annularly spaced apart from each other and are disposed on an outer side of the inner surrounding wall 22 to be respectively aligned with the outer magnetic members 4. Two adjacent ones of the inner magnetic members 5 respectively have magnetic poles that face the outer surrounding wall 23 and that are magnetically opposite to each other. The magnetic pole of each of the inner magnetic members 5 is opposite to that of a respective one of the outer magnetic members 4 (see FIG. 4.)

The windings 6 are respectively wound on the spools 33. The number of the outer magnetic members 4 is a multiple of 2. The number of the windings 6 is a multiple of 3. In this embodiment, the number of the outer magnetic members 4 is 16. The number of the inner magnetic members 5 is 16. The number of the windings 6 is 12.

The first bearing 7 is installed in the first bearing hole 211. The second bearing 8 is installed in the second bearing hole 241. The stationary shaft 31 extends through the first and second bearings 7, 8.

When the windings 6 are energized to produce a magnetic field, the inner and outer magnetic members 5, 4 are rotated by magnetic forces about the stationary shaft 31 so that the rotating unit 2 is rotated relative to the fixing unit 3.

Because each spool 33 extends axially between the inner and outer surrounding walls 22, 23, an axial winding length of each winding 6 can be lengthened along a direction of the axis (L) when an axial length of the respective spool 33 is lengthened along the direction of the axis (L). Therefore, when the spools 33 and the windings 6 are axially lengthened, lengthening the outer and inner magnetic members 4, 5 along the direction of the axis (L) can increase the magnetic forces to rotate the rotating unit 2 so that an output torque can be thereby increased.

By virtue of slightly lengthening the outer and inner magnetic members 4, 5 and the windings 6 along the direction of the axis (L), the output torque can be increased without increasing the size of the rotating unit 2 along a radial direction. Thus, an increase in the output torque neither requires the motor 100 to change much in size, nor cause significant effect on the installation of the outer rotor type motor 100. Unlike the outer rotor type motor 100 of the disclosure, to increase the output torque, the size of the existing motor has to be radially increased. To increase the output torque to a level equal to that of the outer rotor type motor 100 of the disclosure, the size of the existing motor has to change a relatively large extent that may cause difficulties in an installation task. The outer rotor type motor 100 of the disclosure can increase its output torque without affecting much its installation.

On the other hand, with the same output torque, the outer rotor type motor 100 can have the size smaller than the existing motor, thereby saving occupying space.

In conclusion, by virtue of the outer and inner magnetic members 4, 5, the spools 33 and the windings 6 extending along the direction of the axis (L), not only can the rotating unit 2 be rotated relative to the fixing unit 3, but the outer rotor type motor 100 can save substantial space.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An outer rotor type motor, comprising:
  a rotating unit defining an axis and including
    a base wall perpendicular to and rotatable about the axis,
    an inner surrounding wall projecting axially from said base wall,
    an outer surrounding wall projecting axially from said base wall and surrounding said inner wall, and
    a cover connected to one end of said outer surrounding wall oppositely of said base wall;
  a fixing unit including
    a stationary shaft extending along the axis through said base wall and said cover and surrounded by said inner surrounding wall, said rotating unit rotatable about said fixing shaft,
    a spool support connected to and extending radially from said stationary shaft between one end of said inner surrounding wall and said cover, and
    a plurality of spools connected to said spool support and extending axially between said inner and outer surrounding walls, said spools being annularly spaced apart from each other around said stationary shaft, each of said spools being directly connected to said spool support;
  a plurality of annularly spaced-apart outer magnetic members disposed on an inner side of said outer surrounding wall facing said inner surrounding wall, two adjacent ones of said outer magnetic members respectively having magnetic poles that face said inner surrounding wall and that are magnetically opposite to each other;
  a plurality of inner magnetic members equal in number to said outer magnetic members, said inner magnetic members being annularly spaced apart from each other and disposed on an outer side of said inner surrounding wall to be respectively aligned with said outer magnetic members, two adjacent ones of said inner magnetic members respectively having magnetic poles that face said outer surrounding wall and that are magnetically opposite to each other, said magnetic pole of each of said inner magnetic members being opposite to that of a respective one of said outer magnetic members; and
  a plurality of windings respectively wound on said spools,
  wherein, when said windings are energized to produce a magnetic field, said inner and outer magnetic members are rotated by magnetic forces about said stationary shaft so that said rotating unit is rotated relative to said fixing unit.

2. The outer rotor type motor as claimed in claim 1, wherein:
  said base wall has a first bearing hole;
  said cover has a second bearing hole; and
  said rotating unit further includes a first bearing installed in said first bearing hole, and a second bearing installed in said second bearing hole, said stationary shaft extending through said first and second bearings.

3. The outer rotor type motor as claimed as claim 1, wherein the number of said outer magnetic members is a multiple of 2, and the number of said windings is a multiple of 3.

* * * * *